Feb. 21, 1933.  L. P. SCHWEITZER ET AL  1,898,066
METHOD OF MEASURING WEB CHARACTERISTICS
Filed Oct. 22, 1930
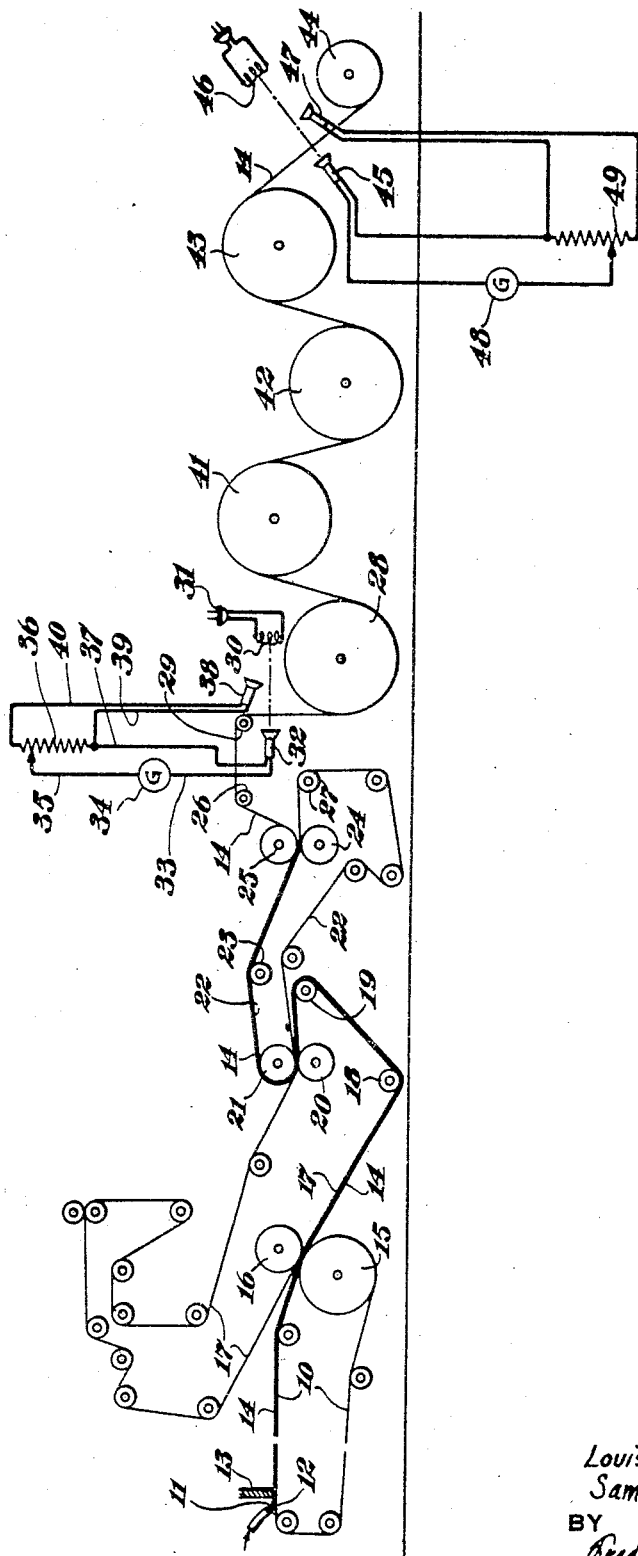
INVENTORS:
Louis P. Schweitzer
Samuel M. Bagno
BY
Frederick Greitenfeld
ATTORNEY Patented Feb. 21, 1933

1,898,066

UNITED STATES PATENT OFFICE

LOUIS P. SCHWEITZER AND SAMUEL M. BAGNO, OF NEW YORK, N. Y., ASSIGNORS TO PETER J. SCHWEITZER, INC., OF NEW YORK, N. Y., A CORPORATION OF NEW YORK

METHOD OF MEASURING WEB CHARACTERISTICS

Application filed October 22, 1930. Serial No. 490,375.

Our present invention relates generally to the measurement of characteristics of web material, and, coordinately, to the manufacture of such material.

Our invention has particular reference to the measurement of certain characteristics of paper, and to a novel and improved apparatus and method for manufacturing paper of an accurately uniform character.

Although we have herein illustrated and shall hereinafter describe our invention as the same may be applied to the manufacture of paper, nevertheless it will be understood that the broader phases of our invention are not restricted to paper measurement or manufacture.

Briefly, our invention is predicated upon the scientific fact, which, we believe, we are the first to have discovered, that the capability of a web of material to transmit energy, and, more especially, radiant energy, bears a definite relationship to certain characteristics of the web, particularly thickness and humidity. Accordingly, one of the main features of our invention lies in causing a beam of energy to be directed through a web, and observing in a novel and particular manner the effect upon the energy of its passage through the web.

Where our invention is applied to the manufacture of paper, and, more especially, the type of paper which is made in the form of a continuous web, it is a general object of our invention to provide a novel means and method for accurately and continuously measuring the thickness of the web, the humidity or water content of the web, or both. A more particular object lies in controlling the manufacture of the paper in accordance with the measurements made, whereby the resultant paper will be of an accurately uniform character.

In accordance with our invention, we have found that if a beam of radiant energy, and, preferably, heat energy, is projected through a paper web, of uniform humidity, then the capability of the web to transmit such energy is almost directly proportional to the thickness of the web. Similarly, we have found that where such a beam is projected through a web of constant thickness, then the capability of the web to transmit the beam through it is almost directly proportional to the humidity of the web.

These two facts are of particular importance in connection with the manufacture of paper upon a Fourdrinier machine. In a machine of this character, a mass of paper stock, consisting of finely comminuted pulp fibers and a liquid-suspending medium therefor, is poured continuously upon a receiving end of a wire screen or the like so as to form a web thereon. Usually, the liquid is water, and the machine not only forms, but also advances, the web in a continuous manner and treats the same, after its formation, to dehydrate it. The dehydration or water-removing procedure is accomplished in two stages; partly by mechanical dehydration means, and partly by thermic means. It has been found that there is a critical point in the advancement of the paper web, to wit, after the mechanical dehydration has exhausted its capabilities, at which the amount of water still entrained by the pulp bears a ratio to the concentration of the latter dependent only upon the characteristics of the pulp itself.

Accordingly, where the energy-transmissive capability of the web is measured at this critical stage, an accurate indication of pulp concentration or web thickness is attained. By utilizing this measurement to control the manufacturing process, so that the pulp distribution or thickness is accurately maintained constant, our present invention permits us to measure the efficiency of the thermic dehydration means, because the energy-transmissive capability of the web, at the stage following the thermic dehydration, will serve as an indication of the humidity of the web at that stage. By utilizing this further measurement to regulate the thermic dehydration apparatus, we have found it possible and practicable to manufacture a continuous web of paper of accurately uniform characteristics of web thickness and humidity.

This uniformity is, of course, highly desirable for a wide variety of reasons, but it is of particular importance in connection with paper utilized by manufacturers of paper dielectric condensers or the like, wherein slight variations in thickness and/or humidity have a material effect upon dielectric properties.

We achieve the foregoing objects, and such other objects as may hereinafter appear or be pointed out, in the manner illustratively exemplified in the accompanying drawing, wherein—

The figure is a diagrammatic elevational view of a typical paper-making machine, shown by way of example, and illustrating the initial formation and the subsequent advancement and treatment of a paper web and the manner in which our invention may be advantageously applied to a manufacturing procedure of this character.

Referring to the drawing, we will point out that a continuously traveling wire screen 10 receives a mass of liquid stock 11 at a point 12. By passing under a doctor 13, the stock, which may, for example, consist of paper pulp and water, is spread over a substantial width, thereby initially forming the web 14 upon the wire 10. A certain portion of the excess water is removed by suction means from the web during the advancement of the wire 10.

We have shown the wire passing over a roll 15 which is arranged in close relationship to a roll 16. Passing beneath the latter is a felt belt 17 which is brought into contact with the paper web 14 as the latter passes between the rolls 15 and 16. As a result of the comparative dryness of the felt 17, the web 14 is transferred bodily from the screen 10 onto the underside of the felt 17 and is carried by the latter around the guide rollers 18 and 19. The felt 17 then passes between the press rolls 20 and 21, and at this point the web 14 is brought into contact with a second felt 22. Due to the relative dryness of the latter, the web 14 is transferred to the felt 22 and is carried by the upper surface thereof over the guide roller 23.

The felt 22 passes between the second set of press rollers 24 and 25, and in the machine herein illustrated, no further felts are encountered, the web 14 being self-sustaining and traveling upwardly from the roller 25, as shown in the drawing. The felt 22 continues by itself over the guide roller 27, and eventually travels back to the first rollers 20—21.

The self-sustaining web 14, upon leaving the roller pair 24 and 25, has arrived at the critical stage hereinbefore referred to. We have found that the mechanical expulsion of water effected by the apparatus thus far described has exhausted its capabilities by the time this stage is reached, and the constituency of the self-sustaining web approaching the guide roller 26 consists solely of pulp fibers and a predetermined amount of water entrained by the fibers solely by virtue of their inherent water-carrying capacity. We have found this predetermined constituency to exist under normal day-by-day and week-by-week conditions, regardless of any special precautions or regulations relating to the fine adjustment of the efficiencies of the several mechanical expulsion devices.

In other words, assuming the machine to be operating in its normally efficient manner, we have found that the particular dryness or relative dryness of the felts, and the relative efficiencies of the pressure rollers, are immaterial so far as the constituency of the web 14 at the critical stage is concerned.

Accordingly, this critical stage is one which may satisfactorily be chosen for the purpose of applying our invention and measuring the capability of the web to transmit energy.

We have diagrammatically shown the manner in which a source of radiant energy 30 may be positioned on one side of the web 14. The source 30 will preferably, though not necessarily, take the form of an electric heating coil, suitable leads connecting the same with a plug 31 which may be associated with an electric outlet box or the like. The heating coil is suitably mounted upon the frame-work of the machine or in any other desired manner, and its position is relatively fixed with respect to the traveling paper web 14.

On the opposite side of the web, and positioned in a manner whereby a beam of radiant heat passing perpendicularly through the web 14 will encounter the same, we arrange a thermo-electric couple 32, preferably in the form of a thermopile of sensitive character. This piece of apparatus is suitably mounted upon the framework of the machine, or in any other desired manner, and is receptively positioned, as above mentioned, with respect to a beam of radiant heat energy emanating from the source 30 and projected through the web.

A lead 33 extends from the thermopile 32 to a current-measuring instrument 34; and a lead 35 is then preferably arranged to extend to a potentiometer 36, from which a lead 37 extends back to the thermopile 32.

The thermopile will react to variations in heat by inducing or producing a varying electrical current in the circuit passing through the instrument 34.

To compensate for slight variations in the heat source itself, we arrange a second thermopile 38 in a fixed position and receptively with respect to the heat emanating from the source 30. The thermopile 38, however, is mounted on the same side of the web as the source 30, so that the beam of energy entering and affecting the piece of apparatus 38 will not pass through the web 14. A lead 39 connects with one end of the potentiometer 36, and a lead 40 with the other end, in the manner illustrated.

By properly adjusting the potentiometer when the apparatus is initially installed, the galvanometer 34 may be made to register or record a zero reading. The adjusting of the potentiometer takes care of the differences in position of the thermopiles, and also of the fact that one thereof is behind the web while the other is not.

This adjustment having been effected, movements of the galvanometer needle thereafter from its zero position will be caused solely by those variations of heat received by the thermopile 32 which are due to variations in the web 14. Since the humidity of the web at the critical stage referred to is constant, the variations in heat energy passing through the web and affecting the thermopile 32 will be due solely to variations in pulp concentration or thickness of the web. By suitably calibrating the instrument 34, the exact thickness may, if desired, be registered or recorded.

We prefer to employ the measurements thus taken for the purpose of controlling the operation of the entire machine so that the thickness of the paper will be maintained accurately uniform. This may be accomplished in any desired manner, as, for example, by speeding or retarding the wire 10 and the other parts of the machine. Thus, suitable drive mechanism actuates the entire machine; and where the motive power is furnished by a steam engine or the like, we have found it both simple and satisfactory to provide a speed-controlling mechanism which is operable upon the governor of the engine. The driving mechanism has not been illustrated in the drawing, because it would only serve to complicate the latter, and because it is well known to those skilled in the art. Usually, a system of gearing drives all the various portions of the machine, such as the wire screen and the press rolls. The speed-controlling mechanism which we have referred to may, for example, consist of a manual control, such as a handwheel, preferably positioned close to the instrument 34, and serving to adjust the governor of the steam engine or similarly to vary the motive power. Or, it might, under certain circumstances, be preferable to provide a relay in the circuit of the galvanometer 34 and cause such relay to operate electrical or mechanical mechanism in an automatic manner to accomplish the same end.

The thermic dehydration of the web is usually effected by causing the web to travel circuitously around a series of heated rollers. For example, we have shown the web 14 traveling over a guide roller 29, thence beneath a heated roller 28, and thence around a series of heated rolls such as those shown at 41, 42, and 43. After the thermic treatment is completed, the web may advantageously be rolled up, as at 44, or it may be subjected to calendering procedures, or the like.

In accordance with our invention, we arrange a duplicate set of thermopiles and energy source in association with the web at the stage where the thermic treatment is complete. Thus, we have shown a thermopile 45 arranged behind the web 14 and adapted to receive a beam of energy projected through the web from the source 46. Another thermopile 47 is arranged to receive a beam of energy directly from the source 46. Suitable electrical connections, similar to those previously described, lead to a galvanometer 48. The galvanometer is preferably adjusted, at initial installation of the apparatus, by means of the potentiometer 49 or the like, so that after the procedure is in operation, any readings of the galvanometer 48 away from its zero reading will be due to variations in current induced solely by variations in the web 14.

Where our method is practiced at the two stages illustrated, it is obvious that the control of the manufacturing process, based upon the measurements taken just before the thermic mechanism, will cause the paper at the stage after the thermic treatment to be of uniform thickness. Accordingly, the variations on the galvanometer 48 may be used to indicate variations in humidity of the paper. These variations in humidity may be correctively regulated by suitable adjustments of the thermic rollers or similar mechanism by any desired means, as, for example, by varying the amount of steam, where steam is the heating medium.

As a result, the paper which winds up at 44 may be caused to be of an accurately uniform thickness and humidity, and this highly desirable effect is produced in a continuous manner and with a minimum of attendance, trouble, and mechanism.

Although we have illustratively shown an electric heating coil as the source of energy which is projected through the web, this particular type of energy source may be varied, if desired, under differing conditions; and practically any source of radiant energy, from extreme infra-red through ultra-violet, and even X-ray radiations, and/or cosmic rays, might be used, the thermopiles being capable in each instance of transforming a certain portion of the energy received by them into heat energy which will induce or produce the necessary electric currents.

Furthermore, it will be understood that although we have illustrated a pair of thermopiles, one on one side of the web and one on the other, this particular arrangement may, under certain circumstances, be unnecessary or may be altered to suit differing requirements, the form described and illustrated serving as an example to show the manner in which our method may be satisfactorily carried out in practice.

Also, it may be desirable under certain circumstances to provide a self-adjusting potentiometer in place of the potentiometer illustrated. In such a case, the current affecting the galvanometer might be used to affect a relay, the latter automatically adjusting the potentiometer so as to cause the galvanometer to read zero. The positional variations or adjustments of the potentiometer would, in such case, indicate or register the ratios of the radiant energy received by the two thermo-couples. An arrangement of this character is particularly useful where relatively great variations in the source of energy are to be expected.

It will also be obvious that our invention is not limited nor restricted to the manufacture of paper either upon a machine of the character illustrated or by any other procedure. Thus, our invention may find wide utility in other arts wherein characteristics of web material are to be ascertained and measured or indicated. In fact, certain phases of our invention may be applicable to the measurement of smoke, a screen or mass of smoke serving in such a case as the "web" herein typified by paper. Accordingly, wherever the term "web" is employed in the appended claims, it is intended to be interpreted in its broadest significance.

It will also be obvious that by properly calibrating the current-measuring instruments the same may be caused to register "weight of paper" or "humidity", or both; or they may be caused to record such readings for permanent record purposes.

Also, although we have shown the stage between the mechanical and dehydration means as a typical stage where the humidity of the web is constant, nevertheless it will be understood that our invention need not be applied at this specific stage of treatment but that this arrangement has been shown herein merely by way of illustration.

Although sizes of parts and their relationship upon a machine or the like will depend largely upon individual requirements, it may be stated that in the form herein shown by way of example we have found it satisfactory to use an electric heating coil in the form of a cylinder approximately one inch in diameter and six inches in length. This coil has been found to operate satisfactorily when mounted at approximately six inches from the web, the thermopile behind the web being approximately four inches from the web, and the other thermopile being approximately thirteen inches from the heating coil. The individual thermopile devices which we have found satisfactory are of the type which have a diameter of approximately one inch and a longitudinal length of approximately two inches, although it will be understood that any equivalent type of suitable instrument may be employed.

One of the important advantages of our present method and apparatus lies in the fact that the operation is not affected by opacity. We have found, e. g., that where two webs have the same thickness and humidity the energy which affects the thermopiles is transmitted equally, regardless of the fact that one web may be more opaque than the other. Also, it will be obvious that no external sources of current are necessary except to operate the heaters, the thermopiles being instruments capable of inducing or producing their own electric currents.

Of particular value is the fact that the paper web remains uncontacted by any extraneous mechanism or contacts throughout its treatment.

In general, it will be obvious that changes in the details herein described and illustrated for the purpose of explaining the nature of our invention may be made by those skilled in the art without departing from the spirit and scope of the invention as expressed in the appended claims. It is therefore intended that these details be interpreted as illustrative, and not in a limiting sense.

Having thus described our invention and illustrated its use, what we claim as new and desire to secure by Letters Patent is—

1. In a process of manufacturing a paper web, the herein-described method of measuring characteristics of said web, which consists in projecting a beam of radiant energy through said web from a source on one side of the web to a thermo-electric couple on the other side of the web, projecting a second beam from said source directly against a second thermo-electric couple, and causing the currents induced by said couples oppositely to actuate a current-measuring instrument so that the readings of said instrument will indicate the effect upon the first-named beam of its passage through the web irrespective of variations in the source itself.

2. In a machine for manufacturing a continuous web of material, an apparatus of the character described, comprising a source of radiant energy mounted on one side of the web and adapted to project a beam through the web and a second beam which clears the web, and a pair of thermo-electric couples, one of which is arranged on the opposite side of the web and receptively positioned with respect to the first-named beam, the other of which is receptively positioned with respect to the second-named beam.

3. In a machine for manufacturing a continuous web of material, an apparatus of the character described, comprising a source of radiant energy mounted on one side of the web and adapted to project a beam through the web and a second beam which clears the web, and a pair of thermo-electric couples mounted in receptive positions with respect to said beams, respectively; an electric circuit including a current-measuring instrument, and means for causing the currents produced by said couples oppositely to actuate said instrument.

In witness whereof we have signed this specification this 15th day of October, 1930.

LOUIS P. SCHWEITZER.
SAMUEL M. BAGNO.